United States Patent
Ooshima

(10) Patent No.: US 8,217,608 B2
(45) Date of Patent: Jul. 10, 2012

(54) ELECTRIC POWER SUPPLY DEVICE

(75) Inventor: Shunzou Ooshima, Kosai (JP)

(73) Assignee: Yazaki Corporation, Tokyo (JP)

( * ) Notice: Subject to any disclaimer, the term of this patent is extended or adjusted under 35 U.S.C. 154(b) by 139 days.

(21) Appl. No.: 12/863,108

(22) PCT Filed: Jan. 16, 2009

(86) PCT No.: PCT/JP2009/050554
§ 371 (c)(1),
(2), (4) Date: Jul. 15, 2010

(87) PCT Pub. No.: WO2009/091033
PCT Pub. Date: Jul. 23, 2009

(65) Prior Publication Data
US 2011/0110002 A1    May 12, 2011

(30) Foreign Application Priority Data

Jan. 16, 2008  (JP) .................................. 2008-006705

(51) Int. Cl.
*H02P 29/02* (2006.01)
(52) U.S. Cl. ......... 318/434; 318/139; 361/31; 361/93.9; 388/903
(58) Field of Classification Search .......... 318/430–434, 318/139; 388/903, 909, 907.5, 930; 361/23–34, 361/93.1, 93.9, 98
See application file for complete search history.

(56) References Cited

U.S. PATENT DOCUMENTS

| 5,511,183 | A | | 4/1996 | Ohmido |
| 5,530,788 | A | * | 6/1996 | Saijima ........................ 388/811 |
| 5,767,647 | A | | 6/1998 | Akiyama et al. |
| 5,982,120 | A | | 11/1999 | Akiyama et al. |
| 7,079,368 | B2 | * | 7/2006 | Ishikawa et al. ............. 361/93.1 |
| 7,113,376 | B2 | | 9/2006 | Nomura et al. |
| 7,177,130 | B2 | | 2/2007 | Ohshima |
| 7,193,382 | B2 | * | 3/2007 | Jeon .............................. 318/434 |
| 7,339,424 | B2 | * | 3/2008 | Kang et al. ....................... 330/10 |

(Continued)

FOREIGN PATENT DOCUMENTS

JP          04-278867 A        10/1992

(Continued)

OTHER PUBLICATIONS

International Search Report [PCT/ISA/210] issued Apr. 21, 2009 in PCT/JP2009/050554.

*Primary Examiner* — Eduardo Colon Santana
(74) *Attorney, Agent, or Firm* — Sughrue Mion, PLLC

(57) ABSTRACT

An electric power supply device capable of miniaturizing an FET and wiring and reducing the amount of heat generation even when a motor load goes into a lock state is provided. It is determined whether or not a lock current flows in a motor M1 by comparing various determination voltages with a voltage Vds between a drain and a source of a MOSFET (T1), and in the case of detecting that the lock current flows, an operation of turning off the MOSFET (T1) until a retry cycle to elapses after turning on the MOSFET (T1) for only energization time tb for which lock torque can be caused is repeatedly executed. Then, when a motor current ID becomes smaller than the lock current, control of returning the MOSFET (T1) to a normal operation is performed. Consequently, the lock current can be prevented from flowing continuously.

9 Claims, 10 Drawing Sheets

U.S. PATENT DOCUMENTS

| | | | |
|---|---|---|---|
| 7,589,490 B2 * | 9/2009 | Haesters et al. | 318/811 |
| 7,607,827 B2 * | 10/2009 | Karikomi et al. | 374/141 |

FOREIGN PATENT DOCUMENTS

| | | |
|---|---|---|
| JP | 06-269194 A | 9/1994 |
| JP | 10-094282 A | 4/1998 |
| JP | 3102355 B2 | 8/2000 |
| JP | 2002-353794 A | 12/2002 |
| JP | 2004-023638 A | 1/2004 |
| JP | 2004-282920 A | 10/2004 |
| JP | 2005-082968 A | 3/2005 |

* cited by examiner

ELECTRIC POWER SUPPLY DEVICE

TECHNICAL FIELD

The present invention relates to an electric power supply device for supplying electric power to a driving circuit of a motor load, and particularly to a technique for reducing heat generation by a lock current flowing in the case where the motor load locks.

BACKGROUND ART

A radiator fan motor (hereinafter simply called a "motor") installed in a vehicle is taken as an example of a motor load. FIG. 10 is a circuit diagram showing a driving circuit of a conventional motor M1. As shown in FIG. 10, the driving circuit includes an engine control unit (hereinafter called an "ECU") 101, a battery VB, and the motor M1. Then, a relay X1 is arranged between the battery VB and the motor M1 and further, a relay X2 is arranged between the motor M1 and a ground. In addition, numeral "VB" shall hereinafter be used in both of the case of showing the battery itself and the case of showing a voltage output from the battery.

An output terminal A of the ECU 101 is connected to an exciting coil of the relay X1, and an output terminal B of the ECU 101 is connected to an exciting coil of the relay X2.

The relay X2 has transfer contacts and when connection between normally-closed contacts c and b is made, one end of the motor M1 is grounded to the ground through a resistor R101. When connection between normally-open contacts c and a is made, one end of the motor M1 is directly grounded to the ground.

Then, when a cooling water temperature is relatively low and it is necessary to rotate a fan, the ECU 101 energizes an output signal S1 of the terminal A to turn on the relay X1 and shuts off an output signal S2 of the terminal B to turn off the relay X2. Consequently, the battery voltage VB is applied to a series circuit of the motor M1 and the resistor R101 and the voltage applied to the motor M1 decreases by a voltage drop occurring in the resistor R101, so that the motor M1 rotates at low speed.

On the other hand, when the cooling water temperature becomes high, the ECU 101 energizes the output signal S2 of the terminal B to turn on the relay X2. Consequently, the normally-open contacts c and a of the relay X2 conduct and the battery voltage VB is applied to the motor M1 and the motor M1 rotates fully.

Here, the motor M1 locks when rotation of a radiator fan is forcibly blocked by submersion etc. of the radiator fan or snow engages with the radiator fan during travel of the vehicle. Then, a lock current flows in the motor driving circuit, and the motor M1 and the driving circuit generate heat.

Here, a PTC element (a resistive element with a positive temperature coefficient) is normally incorporated into the motor M1 in series with an armature. When a temperature of the motor M1 is low, the PTC element indicates a low resistance value and does not block a motor driving current, but when a large current like the lock current continues to flow, a temperature of the PTC element increases by Joule heat and the motor driving current is limited and heat generation is prevented. Also, rotation of the motor M1 returns to the original state when a factor in blocking the rotation of the radiator fan is eliminated.

DISCLOSURE OF THE INVENTION

Problems that the Invention is to Solve

However, until the PTC element limits the motor current after the motor M1 locks, the lock current continues to flow in the motor M1, so that it becomes necessary to set specifications of a wiring diameter so as not to cause smoke generation in wiring used in the motor driving circuit until this limitation of the motor current. Also, in FIG. 10, it is contemplated to replace the relay X1 with an FET but in that case, it becomes necessary to use the appropriate high-capacity FET so as not to thermally destroy the FET by the lock current.

In other words, in the conventional device for supplying electric power to the motor load, it is necessary to set the wiring diameter and the capacity of the FET so as not to damage a circuit element even when the lock current flows on the premise that the lock current continues to flow, and a desire to manage to miniaturize the wiring and the FET is growing.

The invention has been implemented to solve such conventional problems, and an object of the invention is to provide an electric power supply device capable of miniaturizing the wiring and the FET and reducing the amount of heat generation even when the motor load goes into a lock state.

Means for Solving the Problems

In order to achieve the object, in an electric power supply device for switching supply and stop of electric power to a motor load by performing an on-off operation of an electronic switch which is disposed in a wiring path for connecting a power source to the motor load, the electric power supply device comprises: a current detection section that detects a current flowing in the motor load; and a switch control section that performs control in which an operation of turning off the electronic switch for only a second predetermined time after turning on the electronic switch for only a first predetermined time for which lock torque can be caused is repeatedly executed when the current detection section detects a lock current flowing at the time when the motor load locks, and the electronic switch is returned to a normal operation when the current detection section detects a current smaller than the lock current.

Also, in the invention, the switch control section performs an on-off operation of the electronic switch at a duty ratio of less than 100% in the case of determining that the voltage Vds between both ends of the electronic switch exceeds the standard determination voltage and is less than the first determination value by the comparison section.

Also, in the invention, the switch control section interrupts the electronic switch in the case of determining that the voltage Vds between both ends of the electronic switch exceeds the second determination voltage by the comparison section.

Also, in the invention, the electric power supply device further comprises a counter-electromotive force detection section that detects a counter-electromotive force occurring in an electric wire for connecting the power source to the electronic switch at the time of turning on the electronic switch. The switch control section turns off the electronic switch when magnitude of the counter-electromotive force detected by the counter-electromotive force detection section exceeds a maximum value of the counter-electromotive force produced at the time when wiring and the motor load are in a normal state.

Also, in the invention, the electric power supply device further comprises a counter-electromotive force detection section that detects a counter-electromotive force occurring in an electric wire for connecting the power source to the electronic switch at the time of turning on the electronic switch. The switch control section repeats an operation of again turning on the electronic switch after turning off the electronic switch by a predetermined number of times when magnitude of the counter-electromotive force detected by the counter-electromotive force detection section exceeds a maximum value of the counter-electromotive force produced at the time when wiring and the motor load are in a normal state, and maintains the electronic switch in an off state when the magnitude of the counter-electromotive force again exceeds the maximum value of the counter-electromotive force produced at the time when the wiring and the motor load are in the normal state after repeating the operation of turning on the electronic switch by the predetermined number of times.

Also, in the invention, the current detection section detects the current flowing in the motor load based on a voltage Vds between both ends of the electronic switch, and the switch control section sets a first amplification factor (m1) and a second amplification factor (m2) smaller than the first amplification factor, and determines that the lock current flows in the motor load when an amplified voltage, in which the voltage Vds between both ends of the electronic switch is amplified by the first amplification factor, is larger than a fixed determination voltage B and an amplified voltage, in which the voltage Vds between both ends of the electronic switch is amplified by the second amplification factor, is smaller than the determination voltage B.

Also, in the invention, the switch control section interrupts the electronic switch when the amplified voltage at the time of amplifying the voltage Vds between both ends of the electronic switch by the second amplification factor exceeds the determination voltage B.

Also, in the invention, the electric power supply device further comprises a counter-electromotive force detection section that detects a counter-electromotive force occurring in an electric wire for connecting the power source to the electronic switch at the time of turning on the electronic switch. The switch control section turns off the electronic switch when magnitude of the counter-electromotive force detected by the counter-electromotive force detection section exceeds a maximum value of the counter-electromotive force produced at the time when wiring and the motor load are in a normal state.

Also, in the invention, the electric power supply device further comprises a counter-electromotive force detection section that detects a counter-electromotive force occurring in an electric wire for connecting the power source to the electronic switch at the time of turning on the electronic switch. The switch control section repeats an operation of again turning on the electronic switch after turning off the electronic switch by a predetermined number of times when magnitude of the counter-electromotive force detected by the counter-electromotive force detection section exceeds a maximum value of the counter-electromotive force produced at the time when wiring and the motor load are in a normal state, and turns off the electronic switch when the magnitude of the counter-electromotive force again exceeds the maximum value of the counter-electromotive force produced at the time when the wiring and the motor load are in the normal state after repeating the operation of turning on the electronic switch after turning off the electronic switch by the predetermined number of times.

Advantage of the Invention

In the electric power supply device according to the invention, even when the motor goes into the lock state, the amount of heat generation of circuit components such as the wiring and the electronic switch can be reduced and thus can be made nearly equal to the amount of heat generation at the time of normal operation, so that the circuit components such as the wiring and the electronic switch can be designed with a normal current assumed, and a circuit configuration can be simplified. Accordingly, cost cutting, a saving in space, and reductions in size and weight of the circuit can be achieved.

DESCRIPTION OF REFERENCE NUMERALS AND SIGNS

11 DRIVER CIRCUIT
12 CHARGE PUMP
13 ENGINE CONTROL UNIT (ECU)
21 COUNTER-ELECTROMOTIVE FORCE DETECTION CIRCUIT
T1 MOSFET (ELECTRONIC SWITCH)
M1 MOTOR

BEST MODE FOR CARRYING OUT THE INVENTION

Figure 1:
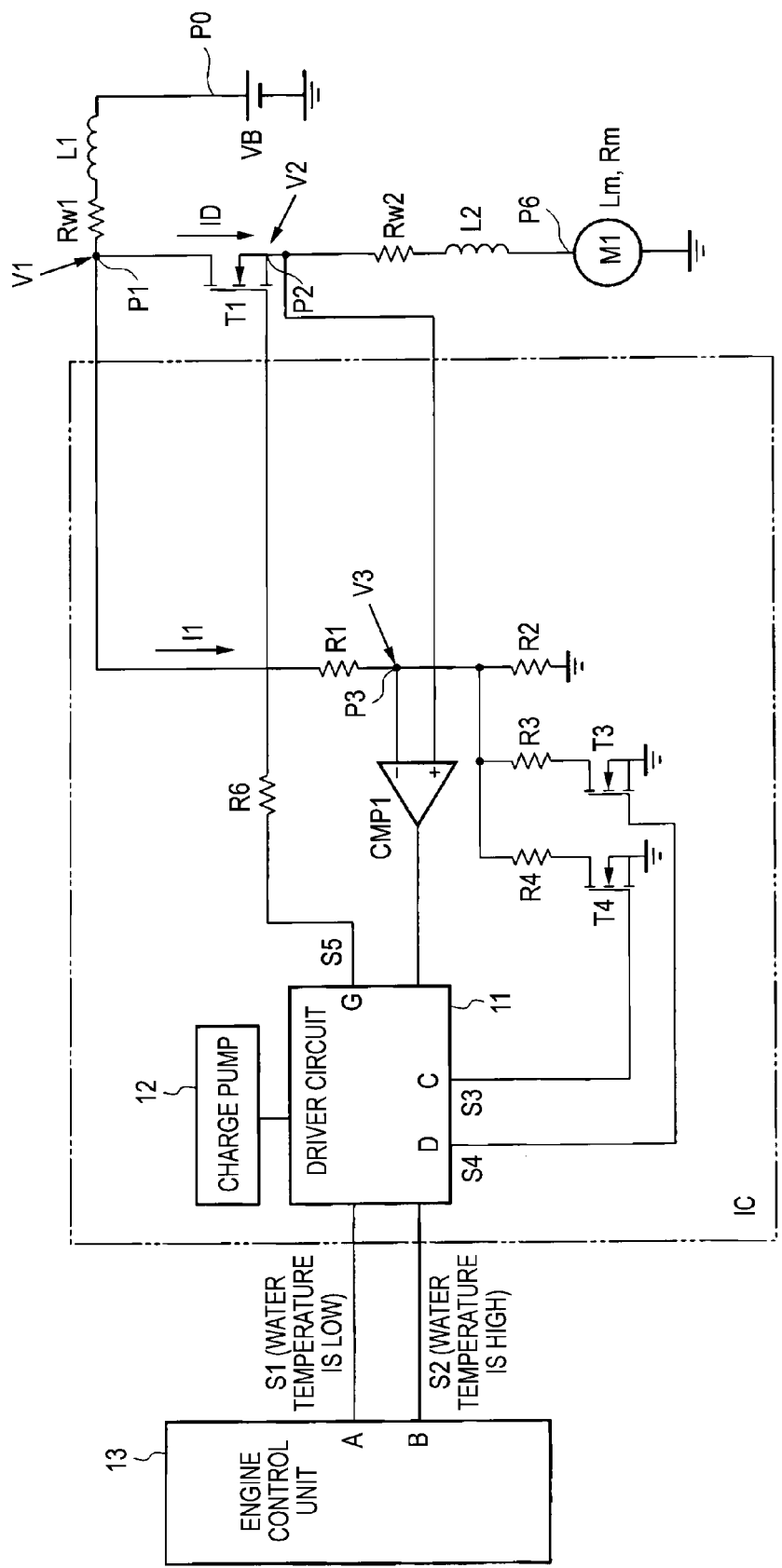
FIG. 1 is a circuit diagram of an electric power supply device according to a first embodiment of the invention.

Embodiments of the invention will hereinafter be described based on the drawings. FIG. 1 is a circuit diagram showing a configuration of a driving circuit of a motor load including an electric power supply device according to a first embodiment of the invention. As shown in FIG. 1, a positive terminal of a battery (a power source) VB is connected to a drain of a MOSFET (T1; an electronic switch) and a source of the MOSFET (T1) is connected to one end of a radiator fan motor M1 (hereinafter simply abbreviated as a "motor M1") and the other end of the motor M1 is grounded to a ground.

A gate of the MOSFET (T1) is connected to an output terminal G of a driver circuit (a switch control section) 11 through a resistor R6. Also, a point P1 which is the drain of the MOSFET (T1) is grounded to the ground through a series circuit of resistors R1 and R2, and a point P3 of connection between the resistors R1 and R2 is connected to an inverting terminal of a comparator CMP1. Further, the point P3 is grounded to the ground through a resistor R3 and a transistor (T3) (for example, a MOSFET) and is grounded to the ground through a resistor R4 and a transistor (T4) (for example, a MOSFET). Here, a circuit including the comparator CMP1, the resistors R1 to R4 and the transistors T3 and T4 is a current detection section.

Here, a point P2 which is the source of the MOSFET (T1) is connected to a noninverting terminal of the comparator CMP1 and an output terminal of the comparator CMP1 is connected to the driver circuit 11.

Also, a gate of the transistor (T3) is connected to an output terminal D of the driver circuit 11 and a gate of the transistor (T4) is connected to an output terminal C of the driver circuit 11. Electric power is supplied from a charge pump 12 to the driver circuit 11, and the driver circuit 11 is connected to output terminals A and B of an engine control unit 13 (hereinafter called an "ECU 13"). A signal S1, which becomes a "L" level when a cooling water temperature of a radiator is relatively low, is output from the output terminal A. A signal S2, which becomes the "L" level when the cooling water temperature of the radiator is relatively high, is output from the output terminal B.

Also, an inductance and a resistance of wiring for making connection between the point P1 shown in FIG. 1 and a point P0 which is a positive terminal of the battery VB are set at L1 and Rw1, and an inductance and a resistance of wiring for making connection between the point P2 which is the source of the MOSFET (T1) and a point P6 which is one end of the motor M1 are set at L2 and Rw2. Further, an armature winding inductance and an armature resistance of the motor M1 are set at Lm and Rm.

An operation of the electric power supply circuit shown in FIG. 1 will hereinafter be described. The ECU 13 includes the two output terminals A and B. The signal S1, indicating that the cooling water temperature is low, is set at the "L" level when the cooling water temperature is higher than a first threshold value. The signal S2, indicating that the cooling water temperature is high, is set at the "L" level when the cooling water temperature is higher than a second threshold value being set higher than the first threshold value. These signals S1 and S2 are input to the driver circuit 11.

Then, when both of the signal S1 (the water temperature is low) and the signal S2 (the water temperature is high) are at "H" levels, a signal S5 output from the output terminal G of the driver circuit 11 becomes "L" and the gate of the MOSFET (T1) is grounded to the ground through the resistor R6. Consequently, the MOSFET (T1) is turned off and the motor M1 goes into a stop state.

Also, when the signal S1 becomes the "L" level, the driver circuit 11 applies a voltage (a power source voltage V1, +10 to 15 V) boosted by the charge pump 12 to the gate of the MOSFET (T1) for only a certain period and thereafter grounds the gate of the MOSFET (T1) for only a certain period. Consequently, in the MOSFET (T1), duty control for conducting on-off repeats at a certain ratio is performed and electric power is supplied to the motor M1 intermittently and the motor M1 rotates at low speed. In the circuit shown in FIG. 1, the duty control is performed at the certain on-off ratio independently of the water temperature for ease of explanation. With this, the motor M1 rotates at low speed at the certain rotation number when the signal S1 is at the "L" level and the signal S2 is at the "H" level.

Also, when both of the signals S1 and S2 become the "L" level, the driver circuit 11 continuously applies the voltage boosted by the charge pump 12 to the gate of the MOSFET (T1), and the MOSFET (T1) is continuously turned on. As a result of that, an output voltage of the battery VB is continuously applied between two terminals of the motor M1, and the motor M1 rotates fully.

When a motor current ID flows in the MOSFET (T1) herein, a voltage drop occurs by an on resistance Ron of the MOSFET (T1). When a drain voltage (a voltage at the point P1) and a source voltage (a voltage at the point P2) of the MOSFET (T1) are set at V1 and V2 and the voltage drop by the on resistance Ron is set at Vds, the following formula (1) is satisfied.

$$Vds = V1 - V2 = Ron * ID \quad (1)$$

On the other hand, a voltage V3 at the point P3 of the circuit including the resistors R1 to R4 changes according to an on state and an off state of the transistors (T3) and (T4). That is, the voltage V3 at the point P3 is a variable "determination voltage A". Now, when a voltage at the point P3 at the time of turning off both of the transistors (T3) and (T4) is set at V3S, a voltage (V1−V3S) occurring in the resistor R1 is expressed by the following formula (2).

$$V1 - V3S = V1 * R1/(R1+R2) \quad (2)$$

Therefore, the voltage V3S is input to the inverting terminal of the comparator CMP1 and the source voltage V2 of the MOSFET (T1) is input to the noninverting terminal of the comparator CMP1. The comparator CMP1 compares the voltage Vds with the voltage (V1−V3S), and (V1−V3S) becomes a standard determination voltage. When the motor M1 rotates normally, the standard determination voltage (V1−V3S) is set so as to satisfy Vds<(V1−V3S).

An output signal of the comparator CMP1 is input to the driver circuit 11 and when the output signal of the comparator CMP1 is at a "H" level, that is, when the voltage Vds is lower than the voltage occurring in the resistor R1 (Vds<(V1−V3S)), the driver circuit 11 can apply a voltage of continuous on (high-speed rotation) or duty control (low-speed rotation) to the gate of the MOSFET (T1) as the signal S5.

Here, when rotation of the motor M1 is forcibly suppressed and the motor M1 locks or when the motor current ID increases by reason of a short-circuit accident etc., the voltage Vds between the drain and the source of the MOSFET (T1) increases. Then, when Vds>(V1−V3S) is satisfied, the output signal of the comparator CMP1 becomes a "L" level and the signal S5 becomes the "L" level and the MOSFET (T1) is turned off.

An operation of the driver circuit 11 at the time when the motor current ID flowing in the motor M1 increases will hereinafter be described with reference to a flowchart shown in FIG. 2 and a characteristic diagram shown in FIG. 4.

Figure 2:
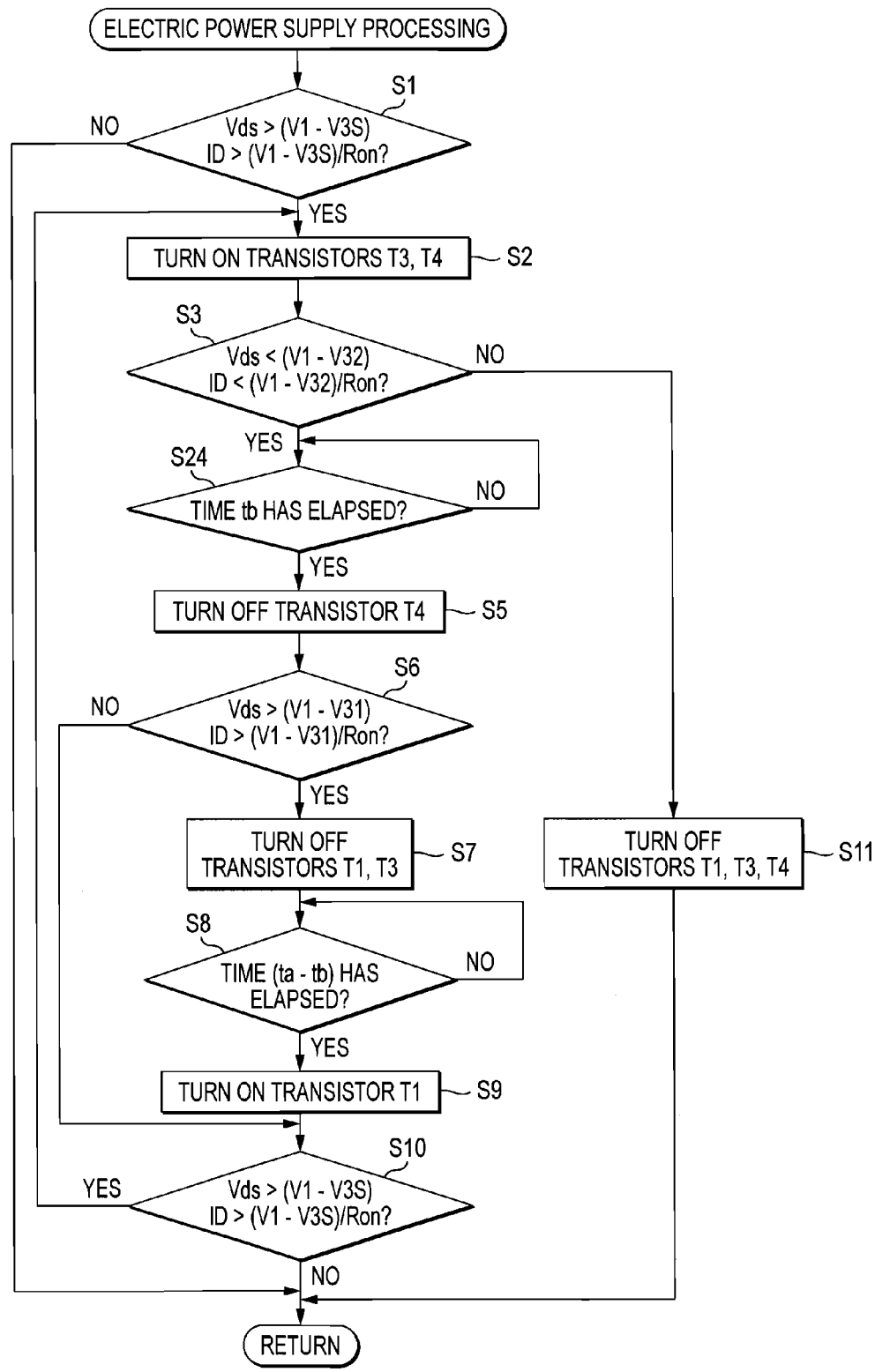
FIG. 2 is a flowchart showing a processing procedure executed by a driver circuit of the electric power supply device according to the first embodiment of the invention.

In step S1 of FIG. 2, it is determined whether or not Vds>(V1−V3S), that is, ID>(V1−V3S)/Ron is satisfied. The driver circuit 11 determines whether or not the voltage Vds exceeds (V1−V3S) set as the standard determination voltage in this processing. Then, in the case of determining that Vds>(V1−V3S) is satisfied, that is, the motor current ID shown in FIG. 4(b) exceeds a standard determination value (V1−V3S)/Ron (hereinafter this is set at "q0"), the processing is shifted to step S2.

In step S2, the driver circuit 11 sets both of a signal S3 output from the output terminal C and a signal S4 output from the output terminal D at the "H" level, and turns on the transistors (T3) and (T4). Then, a parallel-connected circuit of the three resistors R2, R3 and R4 is formed and the voltage at the point P3 becomes a voltage V32 in which the voltage V1 is divided by the resistor R1 and a parallel-connected resistor of the resistors R2, R3 and R4, so that the voltage occurring in the resistor R1 becomes a second determination voltage (V1−V32) larger than the standard determination voltage (V1−V3S).

Here, the second determination voltage (V1−V32) is expressed by the following formula (3).

$$V1-V32=V1*R1/(R1+R2*R3*R4/(R3*R4+R2*R4+R2*R3)) \quad (3)$$

The resistors R3 and R4 in the formula (3) are set so as to satisfy (V1−V32)/Ron>IDL when a lock current is set at IDL. When this processing is ended, the processing is shifted to step S3.

It is determined whether or not Vds>(V1−V32), that is, ID>(V1−V32)/Ron is satisfied in step S3. The driver circuit 11 determines whether or not the voltage Vds exceeds (V1−V32) set as the second determination voltage in this processing. Then, in the case of determining that Vds<(V1−V32) is not satisfied (NO in step S3), the MOSFET (T1) and the transistors (T3) and (T4) are interrupted and the circuit is protected in step S11. That is, when the voltage Vds exceeds the second determination voltage, it is decided that an abnormal current such as a short-circuit flows, and the whole circuit is interrupted.

On the other hand, in the case of determining that Vds<(V1−V32) is satisfied (YES in step S3), it is decided that the lock current IDL caused by locking of the motor M1 occurs, and the processing is shifted to step S4.

The driver circuit 11 decides whether or not preset energization time tb (for example, 42 [msec]) has elapsed in step S4. Then, when the energization time tb has elapsed (YES in step S4), the processing is shifted to step S5.

In step S5, the driver circuit 11 sets the signal S3 output from the output terminal C at the "L" level, and turns off the transistor (T4). Then, a parallel-connected circuit of the two resistors R2 and R3 is formed and the voltage V3 at the point P3 becomes a voltage V31 in which the voltage V1 is divided by the resistor R1 and a parallel-connected resistor of the resistors R2 and R3, so that the voltage occurring in the resistor R1 becomes a first determination voltage (V1−V31) intermediate between the standard determination voltage (V1−V3S) and the second determination voltage (V1−V32).

Here, the first determination voltage (V1−V31) is expressed by the following formula (4).

$$V1-V31=V1*R1/(R1+(R2*R3/(R2+R3))) \quad (4)$$

The resistor R3 in the formula (4) is set so as to satisfy (V1−V31)/Ron<IDL. As one example, a value of each of the resistors R2, R3 and R4 can be set so as to have a relation of R3=2*R4=R2. When this processing is ended, the processing is shifted to step S6.

It is determined whether or not the voltage Vds>(V1−V31), that is, ID>(V1−V31)/Ron is satisfied in step S6. The driver circuit 11 determines whether or not the voltage Vds exceeds (V1−V31) set as the first determination voltage in this processing. Then, in the case of determining that Vds>(V1−V31) is satisfied (YES in step S6), it is decided that the lock current IDL flows continuously, and the processing is shifted to step S7. Also, in the case of determining that Vds>(V1−V31) is not satisfied (NO in step S6), it is decided that the lock current IDL does not flow, and the processing is shifted to step S10.

The driver circuit 11 turns off the MOSFET (T1) and the transistor (T3) in step S7. As a result of this, the current ID flowing in the motor M1 is interrupted. When this processing is ended, the processing is shifted to step S8.

The driver circuit 11 determines whether or not time (ta-tb) obtained by subtracting the energization time tb from a preset retry cycle ta has elapsed in step S8. Here, the retry cycle ta is, for example, 2 [sec]. That is, as shown in FIG. 4(b), when the lock current IDL is detected, the MOSFET (T1) is put into an off state for only the time (ta-tb) after the MOSFET (T1) is held in an on state for only the predetermined energization time tb. Then, when the time (ta-tb) has elapsed, the processing is shifted to step S9.

The driver circuit 11 turns on the MOSFET (T1) in step S9. Consequently, the current ID again flows in the motor M1. When this processing is ended, the processing is shifted to step S10.

In step S10, processing similar to that of step S1 described above is performed. That is, the driver circuit 11 determines whether or not Vds>(V1−V3S), ID>(V1−V3S)/Ron is satisfied, and in the case of determining that Vds>(V1−V3S) is satisfied, that is, the motor current ID shown in FIG. 4(b) exceeds the standard determination value (V1−V3S)/Ron, the processing is returned to step S2. In other words, the retry cycle ta is again repeated in the case where the lock current IDL flows still even when the retry cycle ta in which the MOSFET (T1) is turned on for the energization time tb and thereafter is turned off has elapsed.

Then, when the retry cycle ta is executed one time or plural times and the voltage Vds falls below the standard determination voltage, that is, it becomes NO by the determination of Vds>(V1−V3S), ID>(V1−V3S)/Ron, the MOSFET (T1) is returned to the normal on state.

The above operation will hereinafter be described in further detail with reference to the characteristic diagrams shown in FIG. 4. FIG. 4(a) is the characteristic diagram showing a change in load torque, and FIG. 4(b) is the characteristic diagram showing a change in the motor current ID.

Figure 4:
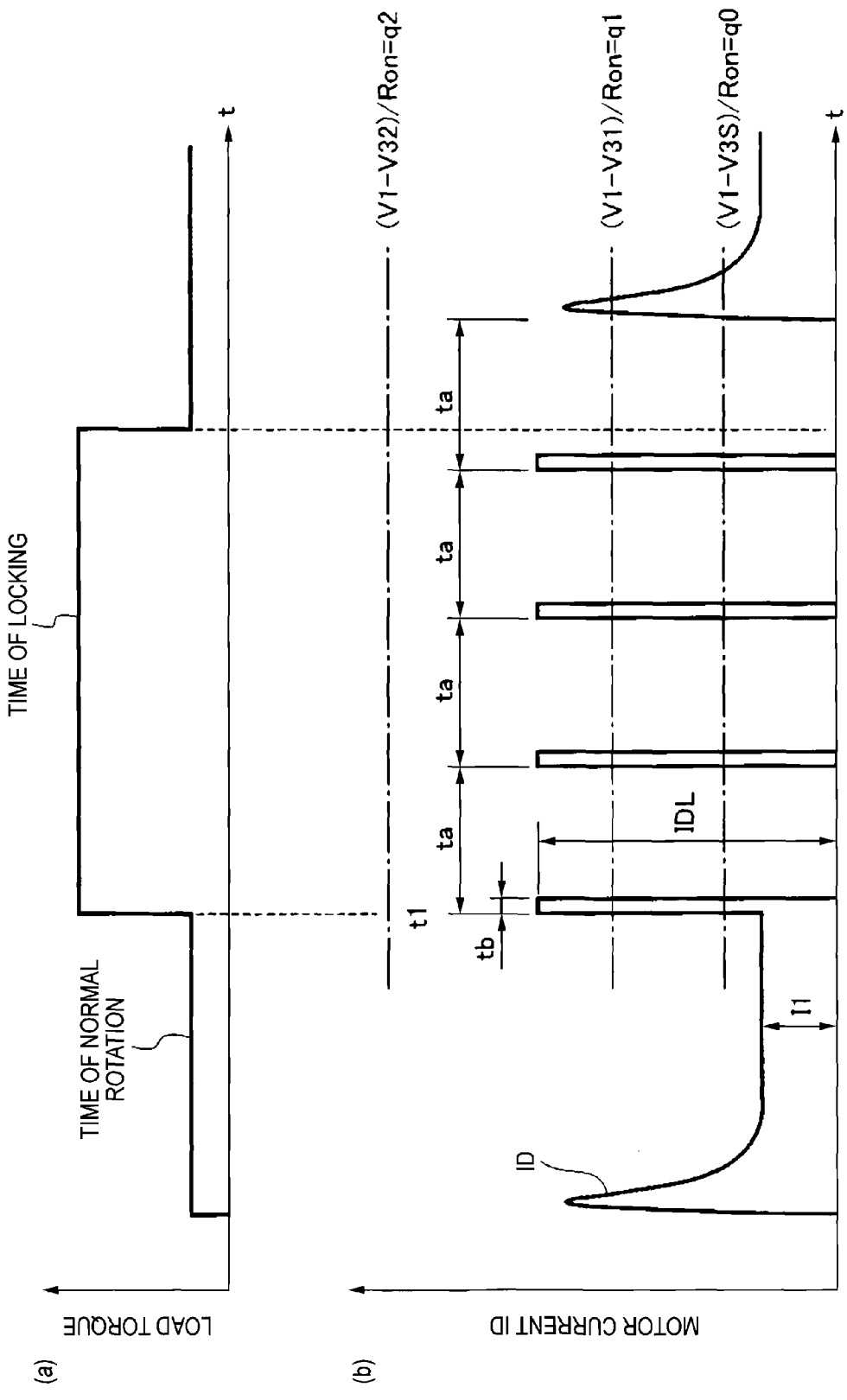
FIG. 4 is a characteristic diagram showing one example of a change in a motor current and a change in load torque of the electric power supply device according to the first embodiment of the invention.

When the motor M1 goes in a lock state at time t1 in FIG. 4, the load torque increases suddenly as shown in FIG. 4(a). At the same time, the motor current ID increases suddenly up to a current value between (V1−V31)/Ron (hereinafter this is set at a "first determination value q1") and (V1−V32)/Ron (hereinafter this is set at a "second determination value q2") as shown in FIG. 4(b). In other words, the first determination value q1 is set at a value smaller than the lock current IDL, and the second determination value q2 is set at a value larger than the lock current IDL.

Then, it becomes YES in step S3 of FIG. 2, and the on state of the MOSFET (T1) is continued for only the energization time tb and when this energization time tb has elapsed, the MOSFET (T1) and the transistor (T3) are turned off in the processing of step S7, so that the motor current ID is interrupted. In other words, the motor current ID does not flow until the retry cycle ta elapses after the energization time tb has elapsed as shown in FIG. 4(b).

When the retry cycle ta has elapsed further, the motor current again flows for only the energization time tb and thereafter, the motor current ID is interrupted until the retry cycle ta elapses, such operations are repeated. In other words, the retry operation described above is repeated while a lock state of the motor is continued, that is, a state of (V1−V32)>Vds>(V1−V31) is continued.

Here, the energization time tb is set at the shortest time (for example, 42 [msec]) necessary to obtain predetermined lock torque and the retry cycle ta is set so as to satisfy a condition expressed by the following formula (5) when the motor current at the time of normal rotation is set at I1.

$$(IDL)^2*tb/ta \leq (I1)^2 \quad (5)$$

The left side of the formula (5) is proportional to average power loss occurring in wiring or the MOSFET (T1) at the time when the lock current IDL flows for only the energization time tb in the retry cycle ta, and the right side of the formula (5) is proportional to power loss occurring in the wiring or the MOSFET (T1) by the current I1 at the time of normal rotation.

When the energization time tb and the retry cycle ta are set so as to satisfy the formula (5), power consumption of the wiring and power consumption of the MOSFET (T1) at the time of locking become less than or equal to the power consumption at the time of normal rotation. The power consumption at the time of locking can be reduced as much as you like when the retry cycle ta is lengthened relatively to the energization time tb. Then, when a wiring diameter between the motor M1 and the MOSFET (T1) and a size of the MOSFET (T1) are set based on the motor current ID at the time of normal rotation so as to satisfy the formula (5), a thermal problem does not occur in the MOSFET (T1) and the wiring even when a motor lock occurs and the lock current flows.

Therefore, the power loss occurring can be reduced as compared with the case of setting the wiring diameter or the MOSFET (T1) on the premise of continuous energization of the lock current conventionally. As one example, when the lock current IDL is three times the current I1 at the time of normal rotation, the power loss at the time when the lock current flows becomes nine times (three squared) that at the time of normal rotation. In the case of adopting the process of the present embodiment, the on resistance of the MOSFET (T1) may be set at nine times and a wiring cross-sectional area may be set at one-ninth.

According to the electric power supply device according to the first embodiment, the current larger than the lock current IDL flowing at the time when the motor M1 locks is set as the second determination value q2 and the current smaller than the lock current IDL is set as the first determination value q1 and when the current detected by the current detection section (the circuit including the comparator CMP1 and the resistors R1 to R4) is a value between the first determination value q1 and the second determination value q2, it is determined that the motor M1 goes into the lock state, and control is performed so as to repeat the operation (retry operation) in which after the lock current flows for only the energization time tb, the MOSFET (T1) is turned off to interrupt the current and the MOSFET (T1) is again turned on after the lapse of the retry cycle ta.

As a result of this, the lock current can be prevented from flowing continuously after the necessary lock torque occurs when the motor M1 goes into the lock state, so that generation of Joule heat by the unnecessary lock current can be suppressed and the wiring and the MOSFET (T1) which is a component of a load driving circuit can be simplified and a saving in space and reductions in weight and cost can be achieved.

Also, when the motor is restored from the lock state, rotation of the motor M1 is restarted, so that it is unnecessary for a user to perform a manipulation of restarting the motor M1. Further, when a large current exceeding the second determination value q2 flows, the retry operation described above is not executed and the circuit is interrupted immediately, so that the circuit can surely be protected, for example, at the time of occurrence of a dead short.

In addition, in the first embodiment described above, the processing for repeatedly executing the retry cycle ta until the lock current IDL is avoided has been performed, but a configuration (a configuration without automatic return) in which a predetermined number of times (for example, ten times) is determined and when the lock current IDL continues to flow still even in the case of repeating the retry cycle ta by the predetermined number of times, the MOSFET (T1) is interrupted can also be used.

Figure 3:
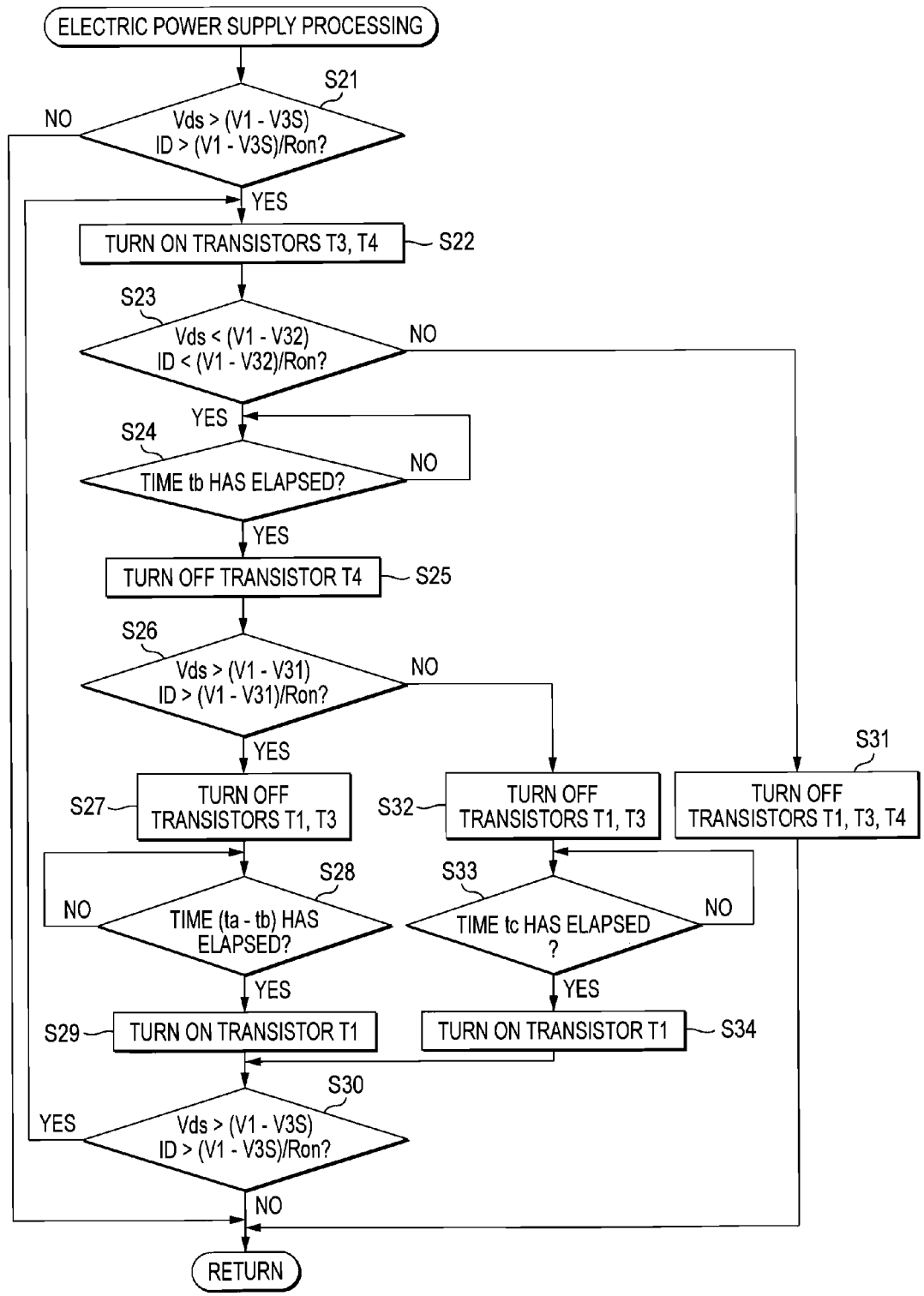
FIG. 3 is a flowchart showing a processing procedure executed by a driver circuit of an electric power supply device according to a modified example of the first embodiment of the invention.

Next, a modified example of the first embodiment described above will be described. FIG. 3 is a flowchart showing a processing procedure of electric power supply processing according to the modified example. Steps S21 to S31 shown in FIG. 3 are the same as steps S1 to S11 shown in FIG. 2. The modified example differs from the first embodiment described above in that steps S32 to S34 are added in FIG. 3.

In step S21 of FIG. 3, it is determined whether or not Vds>(V1−V3S), that is, ID>(V1−V3S)/Ron is satisfied. A driver circuit 11 determines whether or not a voltage Vds exceeds (V1−V3S) set as a standard determination voltage in this processing. Then, in the case of determining that Vds>(V1−V3S) is satisfied, the processing is shifted to step S22.

In step S22, the driver circuit 11 sets both of a signal S3 output from an output terminal C and a signal S4 output from an output terminal D at an "H" level, and turns on transistors (T3) and (T4). Then, a parallel-connected circuit of three resistors R2, R3 and R4 is formed and a voltage at a point P3 becomes a voltage V32 in which a voltage V1 is divided by a resistor R1 and a parallel-connected resistor of the resistors R2, R3 and R4, so that a voltage occurring in the resistor R1 becomes a second determination voltage (V1−V32) larger than the standard determination voltage (V1−V3S). When this processing is ended, the processing is shifted to step S23.

It is determined whether or not Vds>(V1−V32), that is, ID>(V1−V32)/Ron is satisfied in step S23. The driver circuit 11 determines whether or not the voltage Vds exceeds (V1−V32) set as the second determination voltage in this processing. Then, in the case of determining that Vds<(V1−V32) is not satisfied (NO in step S23), a MOSFET (T1) and the transistors (T3) and (T4) are interrupted in step S31.

On the other hand, in the case of determining that Vds<(V1−V32) is satisfied (YES in step S23), it is regarded that a lock current IDL caused by locking of a motor M1 may occur and the processing is shifted to step S24.

The driver circuit 11 decides whether or not preset energization time tb (for example, 42 [msec]) has elapsed in step S24. Then, when the energization time tb has elapsed (YES in step S24), the processing is shifted to step S25.

In step S25, the driver circuit 11 sets the signal S3 output from the output terminal C at an "L" level, and turns off the transistor (T4). Then, a parallel-connected circuit of the two resistors R2 and R3 is formed and the voltage V3 at the point P3 becomes a voltage V31 in which the voltage V1 is divided by the resistor R1 and a parallel-connected resistor of the resistors R2 and R3, so that the voltage occurring in the resistor R1 becomes a first determination voltage (V1−V31) which has an intermediate voltage between the standard determination voltage (V1−V3S) and the second determination voltage (V1−V32). When this processing is ended, the processing is shifted to step S26.

It is determined whether or not the voltage Vds>(V1−V31), that is, ID>(V1−V31)/Ron is satisfied in step S26. The driver circuit 11 determines whether or not the voltage Vds exceeds (V1−V31) set as the first determination voltage in this processing. Then, in the case of determining that Vds>(V1−V31) is satisfied (YES in step S26), it is decided that the lock current IDL flows continuously, and the processing is shifted to step S27. Also, in the case of determining that Vds>(V1−V31) is not satisfied (NO in step S26), it is decided that the lock current IDL does not flow, and the processing is shifted to step S32.

The driver circuit 11 turns off the MOSFET (T1) and the transistor (T3) in step S27. As a result of this, a motor current ID flowing in the motor M1 is interrupted. When this processing is ended, the processing is shifted to step S28.

The driver circuit 11 determines whether or not time (ta-tb) obtained by subtracting the energization time tb from a preset retry cycle to has elapsed in step S28. Then, when the time (ta-tb) has elapsed, the processing is shifted to step S29.

The driver circuit 11 turns on the MOSFET (T1) in step S29. Consequently, the current ID again flows in the motor M1. When this processing is ended, the processing is shifted to step S30.

In step S30, processing similar to that of step S21 described above is performed. That is, the driver circuit 11 determines whether or not Vds>(V1−V3S), ID>(V1−V3S)/Ron is satisfied, and in the case of determining that Vds>(V1−V3S) is satisfied, the processing is returned to step S22. Then, when the retry cycle to is executed one time or plural times and the voltage Vds falls below the standard determination voltage, that is, it becomes NO by the determination of Vds>(V1−V3S), ID>(V1−V3S)/Ron, the MOSFET (T1) is returned to a normal on state.

On the other hand, in the case of determining that Vds>(V1−V31) is not satisfied in the processing of step S26 (NO in step S26), the driver circuit 11 turns off the MOSFET (T1) and the transistor (T3) in the processing of step S32. When this processing is ended, the processing is shifted to step S33.

Figure 5:
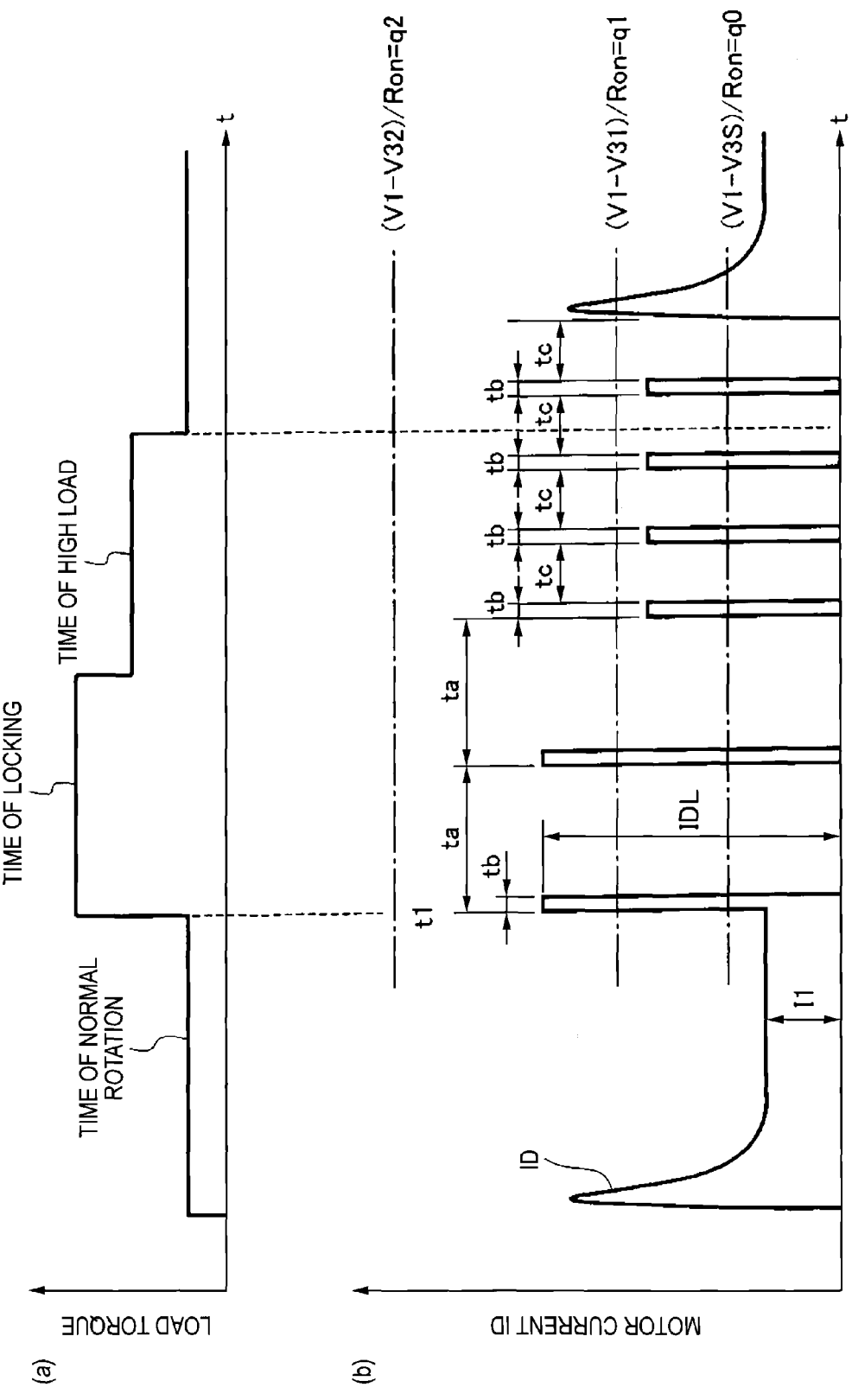
FIG. 5 is a characteristic diagram showing another example of a change in a motor current and a change in load torque of the electric power supply device according to the first embodiment of the invention.

The driver circuit 11 determines whether or not preset time tc has elapsed in step S33. When the time tc is set so as to become tb/(tb+tc)=0.25 herein, the motor is driven at a duty ratio of 25%. This situation is shown in FIG. 5. When this processing is ended, the processing is shifted to step S34.

The driver circuit 11 turns on the MOSFET (T1) in step S34. When this processing is ended, the processing is shifted to step S30.

The current flowing through the MOSFET (T1) continues to flow continuously without interrupting the current when the first determination voltage (V1−V31)>Vds is satisfied in FIG. 3 or 4. Such a situation occurs when torque necessary for motor rotation increases, that is, at the time of a high load. Therefore, if this goes on, a wiring diameter and a capacity of a semiconductor element must be set under a condition of continuously passing the current to the current q1 corresponding to the first determination voltage. The first determination voltage (V1−V31) is supposed to have two times as large as that of the standard determination voltage (V1−V3S), a wiring cross-sectional area and the capacity of the semiconductor element used in the case in which the current q1 flows continuously becomes four times as large as those of the case in which continuously passing the current is limited to the current q0 corresponding to the standard determination voltage.

On the other hand, in the case of performing on-off driving of the MOSFET (T1) at the duty ratio of 25% when a load current has a value corresponding to Vds which exists in the voltage range between the standard determination voltage and the first determination voltage, power loss of wiring and the semiconductor element becomes less than or equal to the power loss at the time of continuously passing the current corresponding to Vds less than the standard determination voltage. That is, the power loss can be reduced by performing duty control of the MOSFET (T1) with respect to the range of current corresponding to Vds of which voltage is not only larger than the standard determination voltage but also less than the first determination voltage. The power loss remains two times that of the case of continuously passing the current corresponding to the standard determination voltage even at the duty ratio of 50%. In the case of the motor load which does not interfere with a function even when such duty control is performed, the capacity of the wiring diameter and the semiconductor element can be reduced by performing the duty control.

Figure 6:
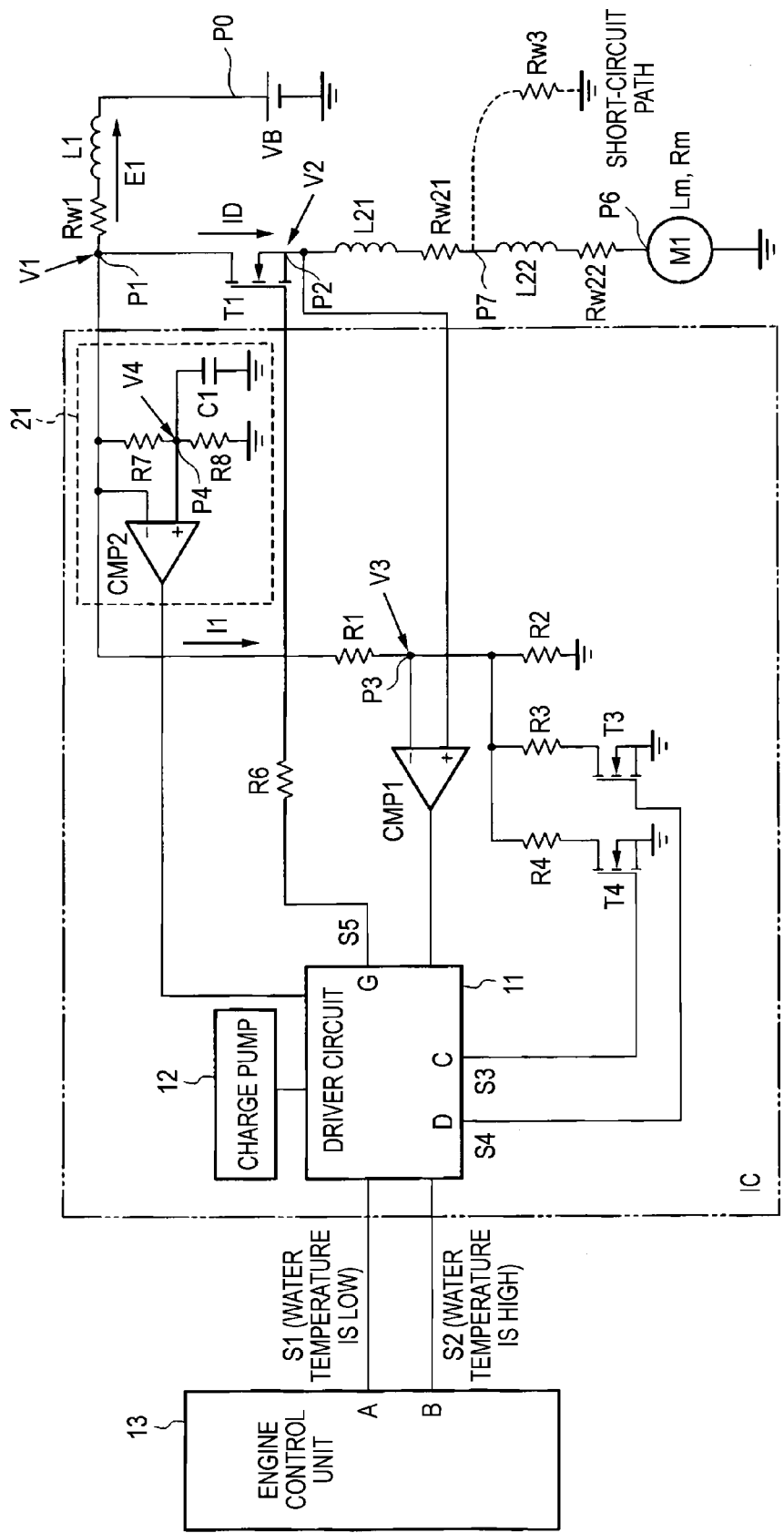
FIG. 6 is a circuit diagram of an electric power supply device according to a second embodiment of the invention.

Next, a second embodiment of the invention will be described. FIG. 6 is a circuit diagram showing a configuration of an electric power supply device according to the second embodiment. The electric power supply device according to the second embodiment differs from the circuit shown in FIG. 1 in that a counter-electromotive force detection circuit 21 is disposed. The counter-electromotive force detection circuit 21 will hereinafter be described in detail.

The counter-electromotive force detection circuit 21 shown in FIG. 6 has a series circuit of resistors R7 and R8 and the series circuit is disposed between a point P1 (a voltage V1) and a ground. Then, a point P4 (a voltage V4) of connection between the resistors R7 and R8 is connected to a noninverting terminal of a comparator CMP2 and is grounded to the ground through a capacitor C1. Also, an inverting terminal of the comparator CMP2 is connected to the point P1 and an output terminal is connected to a driver circuit 11.

An operation of the counter-electromotive force detection circuit 21 will hereinafter be described. When a current ID flowing through a MOSFET (T1) is larger than (V1−V32)/Ron (a second determination value q2) in the case where an accident (a dead short) grounded by a short circuit on the way to wiring for connecting a motor M1 to a source of the MOSFET (T1) occurs in the circuit shown in FIG. 1 of the first embodiment described above, it is determined that an overcurrent occurs, and the MOSFET (T1) is interrupted (by the processing of steps S3 and S11 of FIG. 2) and the MOSFET (T1) can be latched in an interruption state.

However, when the drain current of FET T1 is smaller than (V1−V32)/Ron (the second determination value q2) and is larger than (V1−V31)/Ron (a first determination value q1), a retry operation is executed in a retry cycle to even when the MOSFET (T1) is interrupted. That is, though an abnormal overcurrent flows, it is decided that this is a lock current, and the retry operation is repeated. Here, wiring for connection and the MOSFET (T1) are not destroyed by the retry operation, but it is useless to continue the retry operation though it is not in a lock state, and it is desirable to interrupt the circuit immediately.

The circuit shown in FIG. 6 shows the case where wiring between the source (a point P2) of the MOSFET (T1) and a plus terminal (a point P6) of the motor M1 is grounded by a short circuit at a point P7. A short-circuit ground resistance at that time is set at Rw3 and wiring resistances and inductances between P2 and P7 and between P7 and P6 are set at Rw21, L21 and Rw22, L22, respectively. Then, Rw2 and L2 shown in FIG. 1 become Rw2=Rw21+Rw22 and L2=L21+L22.

When a current of the MOSFET (T1) at time t is set at ID1(t) in the case of turning on the MOSFET (T1) in the state shown in FIG. 1, that is, in the state in which the ground by the short circuit at the point P7 does not occur, this current ID1(t) is expressed by the following formula (6).

$$ID1(t)=VB/(Rw1+Rw2+Rm)*(1-\text{Exp}(-(Rw1+Rw2+Rm)/(L1+L2+Lm)*t)) \quad (6)$$

Since ID1(t) at t=0, that is, ID1(0) is 0 (zero), voltage drops by Rw1, Rw2 and Rm at t=0 become zero and when a voltage of the point P1 at time t=0 is set at V11(0), the voltage V11(0) is expressed by the following formula (7).

$$V11(0) = VB - L1*(d(ID(t))/dt|_{t=0}) \quad (7)$$
$$= VB - L1*VB/(L1 + L2 + Lm)$$
$$= VB*(L2 + Lm)/(L1 + L2 + Lm)$$

Here, an inductance per meter of wiring is about 1 [μH], so that the inductances L1 and L2 are about several [μH] at most. On the other hand, the inductance Lm of the motor M1 is made of an inductance of armature winding of the motor M1 and becomes several hundreds [μH] in the normal DC motor. Therefore, it is apparent from the formula (7) that the voltage V11(0) becomes a voltage which drops by several percents than a battery voltage VB. That is, the voltage V1 at the time when the MOSFET (T1) is turned on and the motor current ID starts to flow drops only slightly than the battery voltage VB.

On the other hand, a current ID2(t) is expressed by the following formula (8) when a current of the MOSFET (T1) at time t in the case of turning on the MOSFET (T1) in a state grounded by the short circuit at the point P7 is set at ID2(t) as shown in FIG. 6.

$$ID2(t)=VB/(Rw1+Rw21+Rw3)*(1-\text{Exp}(-(Rw1+Rw21+Rw3)/(L1+L21)*t)) \quad (8)$$

Since ID2(0)=0 is satisfied, a voltage V12(0) is expressed by the following formula (9) when a voltage of the point P1 at time t=0 is set at V12(0).

$$V12(0) = VB - L1*(d(ID2(t))/dt|_{t=0}) \quad (9)$$
$$= VB - L1*VB/(L1 + L21)$$
$$= VB*(L21)/(L1 + L21)$$

The voltage V12(0) becomes a voltage in which the battery voltage VB is divided by the inductances L1 and L21. When a power source side wiring length is equal to a short-circuit line length (point P2 to point P7), the voltage V12(0) becomes a voltage of 50% of the battery voltage VB. When the short-circuit line length becomes short, the voltage V12(0) drops further.

Therefore, a big difference between the motor current ID flowing through the large inductance Lm by motor winding and a short-circuit current which does not pass through the motor winding inductance Lm occurs in the drop amount of voltage V1 at the point P1 at the time of turning on the MOSFET (T1).

Figure 7:
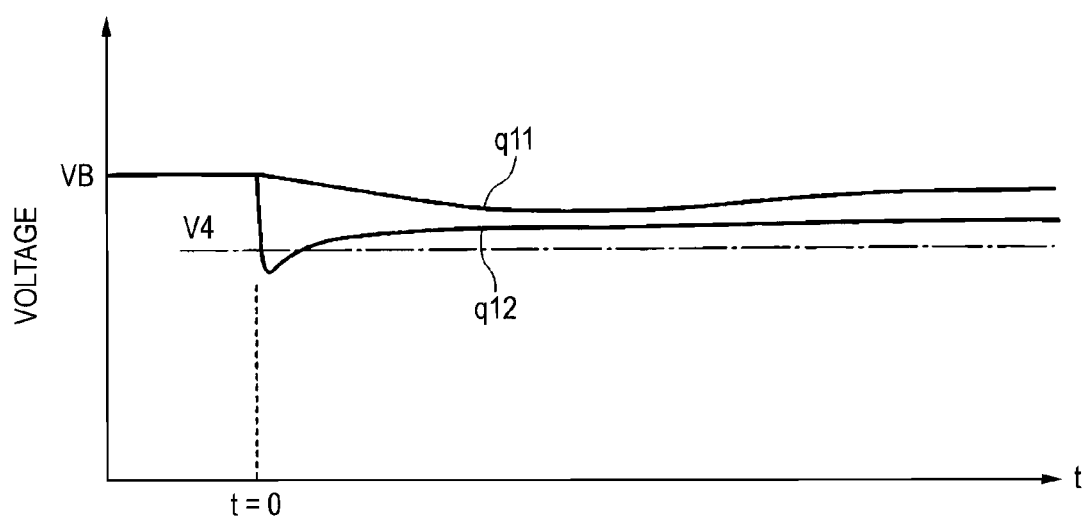
FIG. 7 is a characteristic diagram showing a change in a voltage at the time when a short circuit in wiring occurs in the electric power supply device according to the second embodiment of the invention.

This is shown in a characteristic diagram of FIG. 7. FIG. 7 respectively shows a V1 waveform (q12) at the time when a short circuit in wiring occurs at the point P7 and a V1 waveform (q11) at the time when only the motor current ID flows (the short circuit in wiring does not occur) at the time of turning on the MOSFET (T1) at t=0. When the short circuit in wiring does not occur, there is little drop of the voltage V1 just after t=0 as shown in the curve q11, but when the short circuit in wiring occurs, the voltage V1 drops largely as shown in the curve q12. By using this difference, the motor current ID can be distinguished from the short-circuit current.

In the counter-electromotive force detection circuit 21 shown in FIG. 6, a circuit including the resistors R7, R8, the capacitor C1 and the comparator CMP2 is disposed in order to detect the drop amount of voltage V1 at the time of turning on the MOSFET (T1).

When the MOSFET (T1) is turned off, the capacitor C1 is charged with the voltage V4 at that time. When the MOSFET (T1) is turned on, the motor current ID starts to flow and thereby, the voltage V1 drops. The voltage V4 cannot change immediately by disposing the capacitor C1, so that when the drop of the voltage V1 is large, V1<V4 is satisfied (see the curve q12 of FIG. 7) and an output of the comparator CMP2 is inverted. When the MOSFET (T1) is turned off, V1=VB is satisfied, so that VB-V4 becomes a determination voltage of the drop amount of voltage V1.

In the case of setting V4, (VB-V4) is set to be larger than the drop amount of V1 caused by the starting current, namely rush current, so that is can be determined that the short circuit in wiring occurs when the drop amount of V1 at turning on the MOSFET(T1) is larger than (VB-V4) Then, in the case of determining that the short circuit in wiring occurs, the MOSFET (T1) is interrupted and each wiring for connection and the MOSFET (T1) are protected.

In the electric power supply device according to the second embodiment thus, by disposing the counter-electromotive force detection circuit 21 as shown in FIG. 6, it is detected that the short circuit in wiring occurs, and when the short circuit in wiring occurs, the MOSFET (T1) is interrupted without performing the retry operation, so that the unnecessary retry operation can be prevented from being performed at the time of occurrence of the overcurrent other than the lock current.

In addition, in the second embodiment described above, the case of interrupting the circuit without performing the retry operation by considering that the short circuit in wiring occurs in the case of determining that (the drop amount of V1)>(VB-V4) is satisfied has been described.

Here, there are cases where the drop of the voltage V1 is caused by a short circuit in wiring of other load circuits sharing a power source wire, an instantaneous interruption of the power source wire, and a sudden decrease in the battery voltage VB, etc. Therefore, it is desirable to limit a determination of the short circuit in wiring of its own circuit only when the drop amount of voltage V1 becomes larger than (VB-V4) within a certain period just after starting of the MOSFET(T1).

Further, in the case of interrupting the MOSFET (T1) by determining that the short circuit in wiring of its own circuit occurs, it may be constructed so that by performing several retry operations after interruption, error interruption is avoided and the determination of the short circuit in wiring is made more accurately. In other words, when the comparator CMP2 determines that the short circuit in wiring occurred and thereby the MOSFET (T1) is turned off, the MOSFET (T1) is again turned on after a lapse of a predetermined time and this is repeated plural times and when the overcurrent flows still, control can also be performed so as to maintain an off state of the MOSFET (T1).

Next, a third embodiment of an electric power supply device according to the invention will be described. In the first embodiment and the second embodiment described above, the voltage Vds which is a voltage of difference between the source voltage V2 and the drain voltage V1 of the MOSFET (T1) is compared with the determination voltage as it is. That is, the circuit shown in FIGS. 1 and 6 is configured to compare the voltage Vds with the voltage occurring in the resistor R1.

Figure 8:
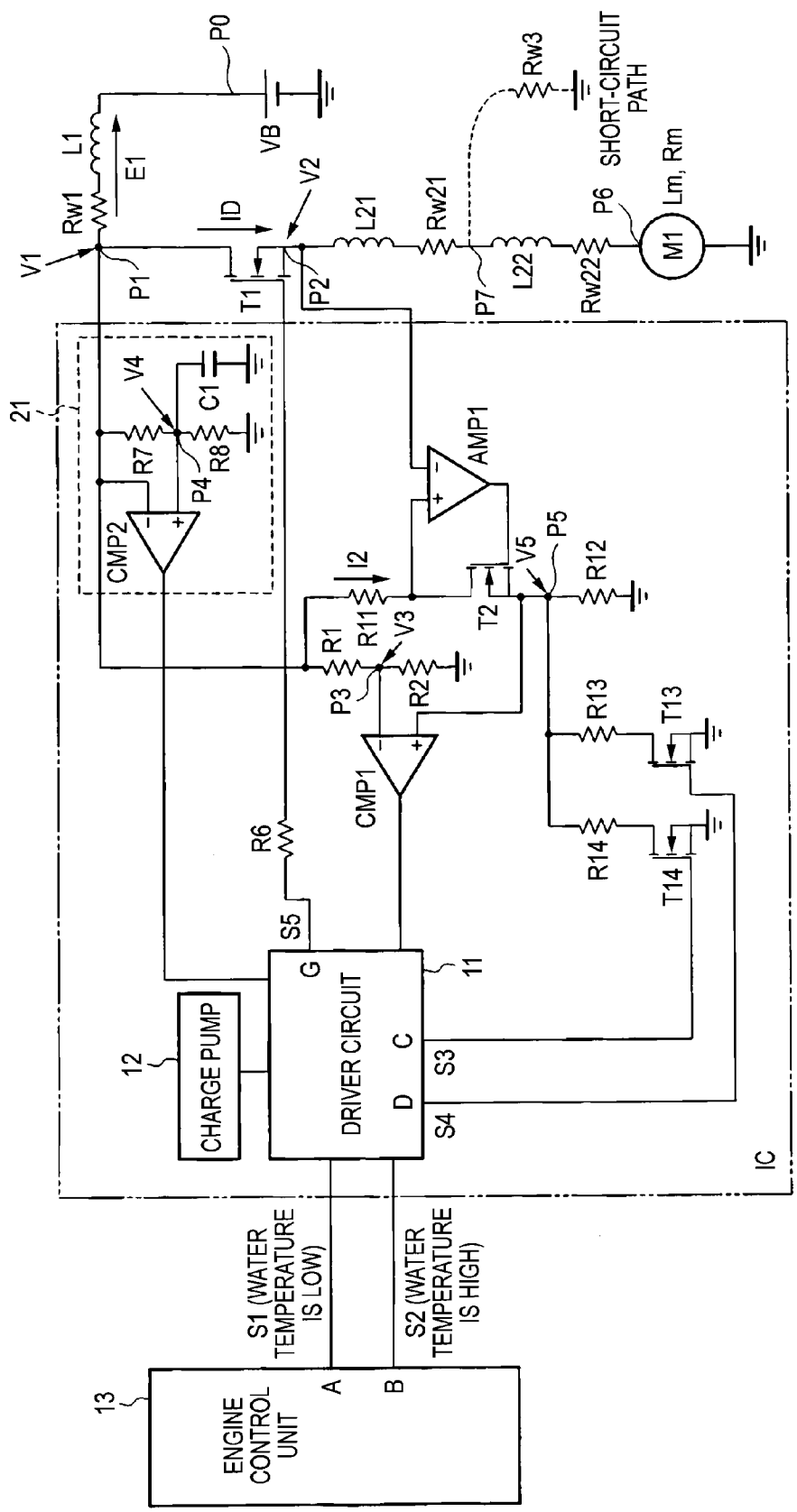
FIG. 8 is a circuit diagram of an electric power supply device according to a third embodiment of the invention.

On the other hand, in the third embodiment, after a voltage Vds is amplified, the voltage Vds is compared with a determination value as shown in FIG. 8. That is, in the first embodiment and the second embodiment described above, magnitude of the determination voltage (variable "determination voltage A") is changed (increased) in three stages of the standard determination voltage, the first determination voltage and the second determination voltage, but in the third embodiment, a determination voltage (fixed "determination voltage B") is fixed at a certain value and an amplification factor of the voltage Vds is changed (decreased) in three stages.

In order to amplify the voltage Vds, a series circuit of a resistor R11, a transistor (T2) (for example, a MOSFET) and a resistor R12 is disposed between a point P1 and a ground and further, an amplifier AMP1 for controlling the transistor (T2) is arranged. A voltage of a point of connection between the resistor R11 and the transistor (T2) is input to a noninverting terminal of the amplifier AMP1 and a source voltage V2 of a MOSFET (T1) is input to an inverting terminal of the amplifier AMP1 and an output terminal of the amplifier AMP1 is connected to a gate of the transistor (T2).

In this circuit, control is performed by the amplifier AMP1 so that the voltage Vds always becomes equal to a voltage drop of the resistor R11, and also the same current I2 flows in the resistor R11 and the resistor R12, so that a voltage drop V5 of the resistor R12 is expressed by the following formula (10) when both of transistors (T13) and (T14) are in the off state.

$$V5 = R12*I2 = R12/R11*R11*I2 = R12/R11*Vds \quad (10)$$

Here, ms is a standard amplification factor for R12/R11=ms. The voltage V5 becomes a voltage in which the voltage Vds is amplified by ms times. The voltage V5 is input to a noninverting terminal of a comparator CMP1, and a voltage V3 (fixed "determination voltage B") in which a voltage V1 is divided by a resistor R1 and a resistor R2 is input to an inverting terminal of the comparator CMP1.

Since a voltage-dividing ratio at which the voltage V3 is generated does not vary and is constant unlike the first embodiment described above, the third embodiment copes by decreasing the amplification factor of the voltage Vds in order to have an effect equivalent to three kinds of determination values q0, q1, q2 as shown in FIG. 4(b).

Figure 9:
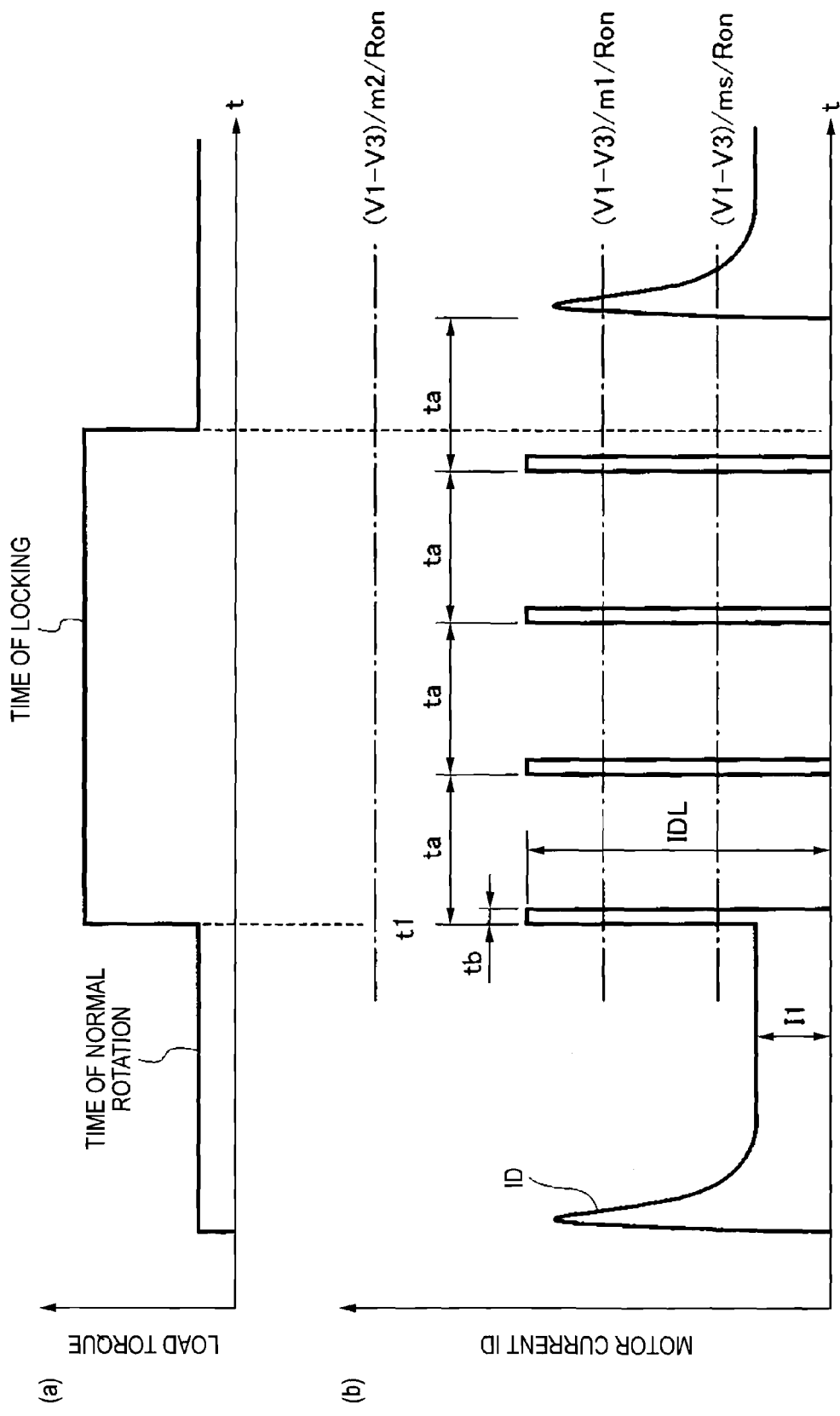
FIG. 9 is a characteristic diagram showing a change in a motor current and a change in load torque of the electric power supply device according to the third embodiment of the invention.
Figure 10:
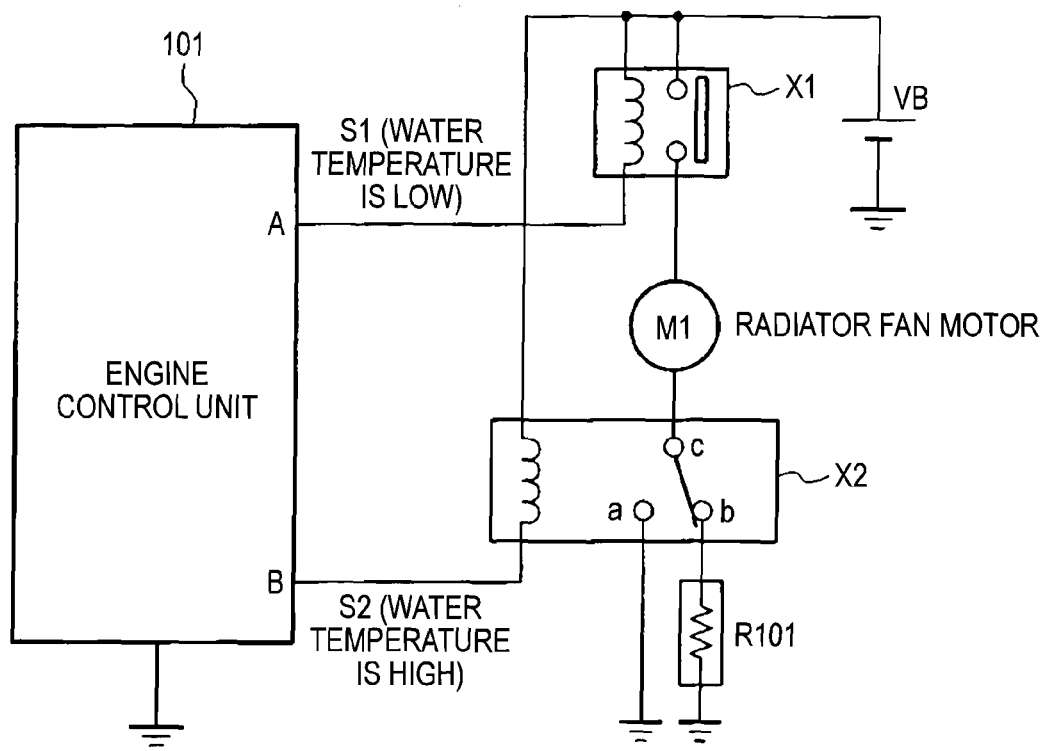
FIG. 10 is a circuit diagram of a conventional electric power supply device.

When the transistor (T13) is turned on, a resistor R13 is arranged in parallel with the resistor R12, so that a combined resistance becomes smaller than R12 and the amplification factor decreases. This case is a first amplification factor and this is represented as m1. The amplification factor at the time of turning on both of the transistors (T13) and (T14) is a second amplification factor and this is represented as m2. A relation among these amplification factors is ms>m1>m2, and replacement of the determination values (q0, q1, q2) of the three stages shown in FIG. 4(b) with the amplification factors of the three stages is shown in FIG. 9.

When a motor M1 has a normal rotation number, the amplification factor is maintained at the standard amplification factor ms. Then, when the motor M1 goes into a lock state and a motor current ID increases and the voltage V5 at a point P5 exceeds the voltage V3 set as the determination value, the transistors (T13) and (T14) are turned on and the amplification factor changes from the standard amplification factor ms to the second amplification factor m2. The voltage V5 corresponding to a lock current in this state becomes the voltage V3 or less set as the determination value.

Then, the amplification factor is changed to the first amplification factor m1 when energization time tb has elapsed like the first embodiment described above. In this amplification factor m1, the voltage V5 corresponding to the lock current exceeds the determination voltage V3, so that an output of the comparator CMP1 is inverted and the MOSFET (T1) is interrupted. Since FIG. 9 is the same as FIG. 4 except that the amplification factors of the three stages are used instead of the determination values of the three stages in FIG. 4, the detailed operation explanation is omitted.

Like the first embodiment and the second embodiment described above, also in the electric power supply device according to the third embodiment of the invention thus, when the motor M1 goes into the lock state, control is performed so as to repeat the operation (retry operation) in which after the lock current is passed for only the energization time tb, the MOSFET (T1) is turned off to interrupt the current and after the lapse of the retry cycle ta, the MOSFET (T1) is again turned on. Therefore, the lock current can be prevented from continuing to flow continuously after the necessary lock torque occurs when the motor M1 goes into the lock state, so that generation of Joule heat by the unnecessary lock current can be suppressed and the wiring and the MOSFET (T1) which is a component of a load driving circuit can be simplified and a saving in space and reductions in weight and cost can be achieved.

Also, when the motor is restored from the lock state, rotation of the motor M1 is restarted, so that it is unnecessary for a user to perform a manipulation of restarting the motor M1. Further, when a large current exceeding (V1−V3)/m2/Ron flows, the retry operation described above is not executed and the circuit is interrupted immediately, so that the circuit can surely be protected, for example, at the time of occurrence of a dead short.

Also, heat generation by an overcurrent can be prevented since the motor current ID is reduced by performing duty control of the MOSFET (T1) in a high load state in which motor rotation torque increases, for example, the motor current ID between (V1−V3)/ms/Ron and (V1−V3)/m1/Ron continues to flow.

The electric power supply device of the invention has been described above based on the illustrated embodiments, but the invention is not limited to this, and the configuration of each part can be replaced with any configuration having a similar function.

The invention has been described in detail with reference to the specific embodiments, but it is apparent to those skilled in the art that various changes or modifications can be made without departing from the spirit and scope of the invention.

The present application is based on Japanese patent application (patent application No. 2008-006705) filed on Jan. 16, 2008, and the contents of the patent application are hereby incorporated by reference.

Industrial Applicability

It is extremely useful in thinning a wiring diameter and reducing specifications of an electronic switch in the case where a lock current flows.

The invention claimed is:

1. An electric power supply device for switching supply and stop of electric power to a motor load by performing an on-off operation of an electronic switch which is disposed in a wiring path for connecting a power source to the motor load, the electric power supply device comprising:
   a current detection section that detects a current flowing in the motor load; and
   a switch control section that performs control in which an operation of turning off the electronic switch for only a second predetermined time after turning on the electronic switch for only a first predetermined time for which lock torque can be caused is repeatedly executed when the current detection section detects a lock current flowing at the time when the motor load locks, and the electronic switch is returned to a normal operation when the current detection section detects a current smaller than the lock current,
   wherein the current detection section has a comparison section for comparing a variable determination voltage A with a voltage (Vds) between both ends of the electronic switch;

wherein the switch control section sets a standard determination voltage (v1−V3S) which is slightly larger than the voltage between both ends of the electronic switch in a normal use state of the current flowing in the motor load, sets a first determination voltage (v1−V31) larger than the standard determination voltage and smaller than the voltage between both ends of the electronic switch at the time when the lock current flows and a second determination voltage (v1−V32) larger than the voltage between both ends of the electronic switch at the time when the lock current flows, changes the determination voltage A to the second determination voltage when the voltage between both ends of the electronic switch exceeds the determination voltage A in the case of setting the determination voltage A at the standard determination voltage, changes the determination voltage A to the first determination voltage when a state, in which the voltage between both ends of the electronic switch is smaller than the determination voltage A, continues for the first predetermined time in the case of setting the determination voltage A at the second determination voltage, and determines that the lock current flows in the motor load when the voltage between both ends of the electronic switch is larger than the determination voltage A in the case of setting the determination voltage A at the first determination voltage.

2. The electric power supply device according to claim 1, wherein the switch control section performs an on-off operation of the electronic switch at a duty ratio of less than 100% in the case of determining that the voltage (Vds) between both ends of the electronic switch exceeds the standard determination voltage and is less than the first determination value by the comparison section.

3. The electric power supply device according to claim 1, wherein the switch control section interrupts the electronic switch in the case of determining that the voltage (vds) between both ends of the electronic switch exceeds the second determination voltage by the comparison section.

4. The electric power supply device according to claim 1, further comprising:
a counter-electromotive force detection section that detects a counter-electromotive force occurring in an electric wire for connecting the power source to the electronic switch at the time of turning on the electronic switch,
wherein the switch control section turns off the electronic switch when magnitude of the counter-electromotive force detected by the counter-electromotive force detection section exceeds a maximum value of the counter-electromotive force produced at the time when wiring and the motor load are in a normal state.

5. The electric power supply device according to claim 1, further comprising:
a counter-electromotive force detection section that detects a counter-electromotive force occurring in an electric wire for connecting the power source to the electronic switch at the time of turning on the electronic switch,
wherein the switch control section repeats an operation of again turning on the electronic switch after turning off the electronic switch by a predetermined number of times when magnitude of the counter-electromotive force detected by the counter-electromotive force detection section exceeds a maximum value of the counter-electromotive force produced at the time when wiring and the motor load are in a normal state, and maintains the electronic switch in an off state when the magnitude of the counter-electromotive force again exceeds the maximum value of the counter-electromotive force produced at the time when the wiring and the motor load are in the normal state after repeating the operation of turning on the electronic switch after turning off the electronic switch by the predetermined number of times.

6. An electric power supply device for switching supply and stop of electric power to a motor load by performing an on-off operation of an electronic switch which is disposed in a wiring path for connecting a power source to the motor load, the electric power supply device comprising:
a current detection section that detects a current flowing in the motor load; and
a switch control section that performs control in which an operation of turning off the electronic switch for only a second predetermined time after turning on the electronic switch for only a first predetermined time for which lock torque can be caused is repeatedly executed when the current detection section detects a lock current flowing at the time when the motor load locks, and the electronic switch is returned to a normal operation when the current detection section detects a current smaller than the lock current,
wherein the current detection section has a comparison section for comparing a fixed determination voltage B with an amplified voltage in which the voltage (Vds) between both ends of the electronic switch is amplified by a variable amplification factor;
wherein the variable amplification factor has a standard amplification factor (ms), a first amplification factor (m1) smaller than the standard amplification factor, and a second amplification factor (m2) smaller than the first amplification factor, and magnitudes of the first amplification factor and the second amplification factor are set so that an amplified voltage, in which the voltage between both ends of the electronic switch at the time when the lock current flows is amplified by the first amplification factor, is larger than the determination voltage B and an amplified voltage, in which the voltage between both ends of the electronic switch at the time when the lock current flows is amplified by the second amplification factor, is smaller than the determination voltage B;
wherein the amplification factor is changed to the second amplification factor (m2) when the amplified voltage of the voltage (Vds) between both ends of the electronic switch exceeds the determination voltage B in the case of setting the amplification factor at the standard amplification factor;
wherein the amplification factor is changed to the first amplification factor (m1) when a state in which the amplified voltage of the voltage (Vds) between both ends of the electronic switch is smaller than the determination voltage B continues for the first predetermined time in the case of setting the amplification factor at the second amplification factor; and
wherein it is determined that the lock current flows in the motor load when the amplified voltage of the voltage (Vds) between both ends of the electronic switch is larger than the determination voltage B in the case of setting the amplification factor at the first amplification factor.

7. The electric power supply device according to claim 6, wherein the switch control section interrupts the electronic switch when the amplified voltage at the time of amplifying the voltage (Vds) between both ends of the electronic switch by the second amplification factor exceeds the determination voltage B.

8. The electric power supply device according to claim 6, further comprising:

a counter-electromotive force detection section that detects a counter-electromotive force occurring in an electric wire for connecting the power source to the electronic switch at the time of turning on the electronic switch, wherein the switch control section turns off the electronic switch when magnitude of the counter-electromotive force detected by the counter-electromotive force detection section exceeds a maximum value of the counter-electromotive force produced at the time when wiring and the motor load are in a normal state.

9. The electric power supply device according to claim 6, further comprising:

a counter-electromotive force detection section that detects a counter-electromotive force occurring in an electric wire for connecting the power source to the electronic switch at the time of turning on the electronic switch, wherein the switch control section repeats an operation of again turning on the electronic switch after turning off the electronic switch by a predetermined number of times when magnitude of the counter-electromotive force detected by the counter-electromotive force detection section exceeds a maximum value of the counter-electromotive force produced at the time when wiring and the motor load are in a normal state, and turns off the electronic switch when the magnitude of the counter-electromotive force again exceeds the maximum value of the counter-electromotive force produced at the time when the wiring and the motor load are in the normal state after repeating the operation of turning on the electronic switch after turning off the electronic switch by the predetermined number of times.

* * * * *